United States Patent
Messner

(10) Patent No.: US 9,276,822 B2
(45) Date of Patent: Mar. 1, 2016

(54) METHOD FOR TRANSMITTING MESSAGES IN A COMMUNICATION NETWORK

(75) Inventor: Werner Messner, Ingolstadt (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 178 days.

(21) Appl. No.: 14/240,501

(22) PCT Filed: Aug. 22, 2012

(86) PCT No.: PCT/EP2012/066298
§ 371 (c)(1),
(2), (4) Date: Feb. 24, 2014

(87) PCT Pub. No.: WO2013/026857
PCT Pub. Date: Feb. 28, 2013

(65) Prior Publication Data
US 2014/0247831 A1    Sep. 4, 2014

(30) Foreign Application Priority Data
Aug. 24, 2011 (DE) .......................... 10 2011 081 452

(51) Int. Cl.
H04L 12/24 (2006.01)
H04L 12/12 (2006.01)
H04L 12/413 (2006.01)

(52) U.S. Cl.
CPC ................ *H04L 41/32* (2013.01); *H04L 12/12* (2013.01); *H04L 12/413* (2013.01); *Y02B 60/34* (2013.01)

(58) Field of Classification Search
USPC ......................................... 370/400, 396, 389
See application file for complete search history.

(56) References Cited

U.S. PATENT DOCUMENTS

| 6,292,508 B1 | 9/2001 | Hong et al. ................... 375/134 |
| 6,519,720 B1 | 2/2003 | Mores ............................. 714/43 |
| 8,594,106 B2 | 11/2013 | Habetha et al. ............... 370/401 |

(Continued)

FOREIGN PATENT DOCUMENTS

| DE | 10145596 A1 | 4/2003 | ............. H04L 12/28 |
| DE | 102009015197 A1 | 10/2010 | ............. H04L 12/24 |

(Continued)

OTHER PUBLICATIONS

International Search Report and Written Opinion, Application No. PCT/EP2012/066298, 10 pages, Dec. 20, 2012.

*Primary Examiner* — Dang Ton
*Assistant Examiner* — Pamit Kaur
(74) *Attorney, Agent, or Firm* — Slayden Grubert Beard PLLC

(57) ABSTRACT

A method is disclosed for transmitting messages in a communications network with at least three communications nodes. At least one communications node always remains active and stores messages sent by a second communications node. If the second communications node switches to an idle state, the caching node is informed thereof by means of a sleep-event and takes over the sending of the messages for this node. By means of a wake-up event, the caching node obtains information that the second node has switched back into the active state and ceases sending the stored messages. Further nodes, which likewise can switch to the idle state at any time and possibly not receive messages sent by the second node during their own idle phase, thus do not notice anything about the idle state of the second node and operate on the assumption of an up-to-date status in the network at all times.

17 Claims, 4 Drawing Sheets

(56) References Cited

U.S. PATENT DOCUMENTS

| | | | |
|---|---|---|---|
| 2005/0044430 A1 | 2/2005 | Cheshire | 713/300 |
| 2006/0013237 A1 | 1/2006 | Furuta et al. | 370/401 |
| 2010/0079265 A1 | 4/2010 | Miyashita | 340/425.2 |
| 2012/0042186 A1 | 2/2012 | Rott et al. | 713/323 |

FOREIGN PATENT DOCUMENTS

| | | | |
|---|---|---|---|
| EP | 0981875 B1 | 8/2008 | H04L 12/12 |
| WO | 99/46888 A1 | 9/1999 | H04L 12/12 |
| WO | 2013/026857 A1 | 2/2013 | B60R 16/023 | a)

b)

METHOD FOR TRANSMITTING MESSAGES IN A COMMUNICATION NETWORK

CROSS-REFERENCE TO RELATED APPLICATIONS

This application is a U.S. National Stage Application of International Application No. PCT/EP2012066298 filed Aug. 22, 2012, which designates the United States of America, and claims priority to German Application No. 10 2011 081 452.3 filed Aug. 24, 2011, the contents of which are hereby incorporated by reference in their entirety.

TECHNICAL FIELD

This disclosure relates to a method for transmitting messages for safeguarding the up-to-date status of the messages in a communication network having a plurality of transmission nodes.

BACKGROUND

Particularly in motor vehicles, many different controllers are used today. In order to connect these individual electronic system components, bus systems are used, such as CAN (Controller Area Network) or FlexRay. In established bus systems, it is possible to transfer the controllers that are connected to the bus to a quiescent state with reduced power consumption when none of the controllers are required. In this case, however, it is then possible for all respective bus systems and controllers of a connected system to be put into the quiescent state or back into the active state again simultaneously. Even if only a single arbitrary controller is requested for communication on an arbitrary bus, all the others likewise need to be in an active state. Therefore, even controllers that are not required for communication in this period are consuming power.

As part of the reduction of $CO_2$ emissions from vehicles, what is known as partial networking has therefore been developed. In this case, it is possible for individual controllers (node partial networking) or buses (bus partial networking) to be put to "sleep" or "awoken" as required. By way of example, it is thus possible for a trailer controller to remain switched off while there is no trailer on a vehicle, even when other controllers are required on a bus during this time. In this way, controllers consume power only when they are also really needed, and the total power consumption in the vehicle and hence $CO_2$ emissions can be reduced.

EP 0 981 875 B1 describes such a bus system having a plurality of controllers that allows partial networking in order to reduce the average power consumption of an overall bus system having 30 controllers from 2.5 mA to approximately 1.6 mA.

A problem that arises with the introduction of such partial networking is that the controllers can now see any messages or message changes that are sent while they are switched on. Buffer-storing (caching) the values locally in the sleeping controller, that is to say buffer-storing the original or a copy thereof there in a buffer store, for example, as is generally frequently done in data processing, is not possible in this case. If messages were to be sent by other controllers in the system while a controller is sleeping, the controller would, upon being woken up, set out from the state that is stored in its buffer store (cache), which is possibly already outdated when it wakes up, however.

SUMMARY

One embodiment provides a method for transmitting messages in a communication network having at least three communication nodes, in which at least one of the communication nodes is always kept in an active state, at least one of the communication nodes is transferred from the active state to a quiescent state while it is not required for communication, an active communication node is informed of the change in a communication node from the active state to the quiescent state by a sleep event and of the change in the same communication node from the quiescent state back to the active state by a wakeup event, an active communication node has an internal data memory that it uses to store messages or copies of messages from the communication node, and undertakes the sending of these messages or copies of messages when it has been informed of a change in the communication node from the active state to the quiescent state, an active communication node has a hardware data memory to which it transmits messages or copies of messages that are to be sent and that are stored in its internal data memory and provides them there for sending, and the active communication node stops sending the stored messages or copies of messages from the communication node and erases the messages or copies of messages that are ready for sending in its hardware data memory when it has been informed of a change in the communication node from the quiescent state back to the active state.

In a further embodiment, the communication network is a vehicle bus.

In a further embodiment, the active communication node is a controller or a gateway.

In a further embodiment, the sleep event and/or the wakeup event is a network management message from which it is possible to infer the status of the node whose messages are stored by the active node.

In a further embodiment, the sleep event and/or the wakeup event is any piece of information that is suitable for identifying the state change in a node.

In a further embodiment, the sleep event and/or the wakeup event is an information flow that is effected by measurable changes in the environment.

In a further embodiment, individual messages are excluded from storage in the constantly active communication node.

In a further embodiment, the copy is a copy of individual contents of the message.

In a further embodiment, a copy of a message that is sent by the active node has a different ID than the original message.

In a further embodiment, the sending of a stored message by a communication node is a wakeup event.

In a further embodiment, a message and the copy thereof are never sent in a communication network simultaneously.

In a further embodiment, a communication node does not send further messages for a particular period after it has sent a wakeup event.

In a further embodiment, the active communication node stops sending the messages stored after the particular period.

In a further embodiment, a communication node can send messages again itself directly after a wakeup event has been sent.

In a further embodiment, the active communication node sends no further stored messages from the relevant communication node directly after a wakeup event has been received.

In a further embodiment, the active communication node removes the messages from the relevant communication node that are ready for sending in its hardware data memory immediately after the wakeup event has been received.

Another embodiment provides a network having at least three communication nodes that is used for transmitting messages, in which at least one of the communication nodes is always kept in an active state, at least one of the communication nodes is transferred from the active state to a quiescent state while it is not required for communication, an active communication node is informed of the change in a communication node from the active state to the quiescent state by a sleep event and of the change in the same communication node from the quiescent state back to the active state by a wakeup event, an active communication node has an internal data memory that it uses to store messages or copies of messages from the communication node, and undertakes the sending of these messages or copies of messages when it has been informed of a change in the communication node from the active state to the quiescent state, an active communication node has a hardware data memory to which it transmits messages or copies of messages that are to be sent and that are stored in its internal data memory and provides them there for sending, and the active communication node stops sending the stored messages or copies of messages from the communication node and erases the messages or copies of messages that are ready for sending in its hardware data memory when it has been informed of a change in the communication node from the quiescent state back to the active state.

BRIEF DESCRIPTION OF THE DRAWINGS

Example embodiments of the invention are explained in more detail below with reference to the drawings, in which.

DETAILED DESCRIPTION

Figure 1:
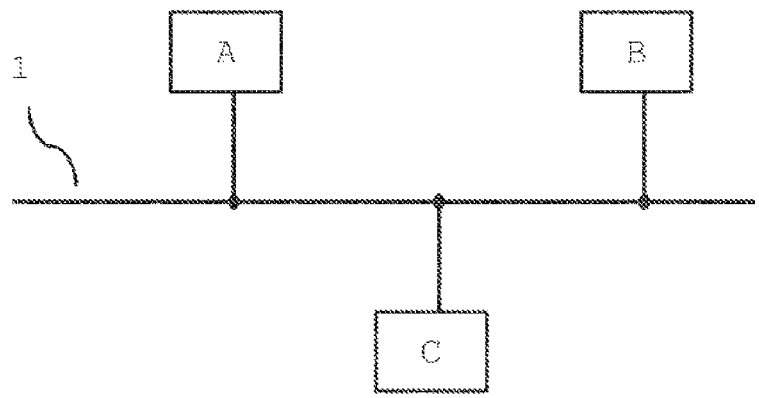
FIG. 1 schematically shows the design of a bus line having a plurality of nodes, FIG. 2a schematically shows the design of a bus system having a plurality of buses and nodes in bus partial networking, FIG. 2b schematically shows the design of a bus system having a plurality of buses and nodes in node partial networking, FIG. 3 uses a graph to show an example of the possible states of two nodes in node partial networking over time, FIG. 4a schematically shows an inventive principle of data caching for the change to the quiescent state of a node in node partial networking, FIG. 4b schematically shows an inventive principle of data caching during the inactivity of a node in node partial networking, FIG. 4c schematically shows an inventive principle of data caching during the inactivity of a node in node partial networking, FIG. 4d schematically shows an inventive principle of data caching for the wakeup of a node in node partial networking, FIG. 4e schematically shows an inventive principle of data caching for the wakeup of a node in node partial networking, and FIG. 5 uses a state diagram to show the transition of the possible states of an active node.

Some embodiments provide a method in which an up-to-date state is safeguarded for each controller after wakeup.

One embodiment provides a method for transmitting messages in a communication network having at least three communication nodes is described. At least one of the communication nodes is always kept in an active state. At least one of the communication nodes is transferred from the active state to a quiescent state while it is not required for communication. An active communication node is informed of the change in another communication node from the active state to the quiescent state by means of a sleep event and of the change in the same communication node from the quiescent state back to the active state by means of a wakeup event. An active communication node has an internal data memory that it uses to store messages or copies of messages from another communication node, and undertakes the sending of these messages or copies of messages when it has been informed of a change in the other node from the active state to the quiescent state. An active communication node has a hardware data memory to which it transmits messages or copies of messages that are to be sent and that are stored in its internal data memory and provides them there for sending. The active communication node stops sending the stored messages or copies of messages from the other communication node and erases the messages or copies of messages that are ready for sending in its hardware data memory when it has been informed of a change in the other communication node from the quiescent state back to the active state.

In addition, a network having at least three communication nodes that is used for transmitting messages is described. At least one of the communication nodes is always kept in an active state. At least one of the communication nodes is transferred from the active state to a quiescent state while it is not required for communication. An active communication node is informed of the change in another communication node from the active state to the quiescent state by means of a sleep event and of the change in the same communication node from the quiescent state back to the active state by means of a wakeup event. An active communication node has an internal data memory that it uses to store messages or copies of messages from another communication node, and undertakes the sending of these messages or copies of messages when it has been informed of a change in the other node from the active state to the quiescent state. An active communication node has a hardware data memory to which it transmits messages or copies of messages that are to be sent and that are stored in its internal data memory and provides them there for sending. The active communication node stops sending the stored messages or copies of messages from the other communication node and erases the messages or copies of messages that are ready for sending in its hardware data memory when it has been informed of a change in the other communication node from the quiescent state back to the active state.

FIG. 1 shows a simplified form of a data bus 1 having a plurality of nodes A, B, C. In this case, a node may be a controller or another component, for example. The nodes A, B, C use the bus 1 as a shared transmission path for transmitting data. In this case, all the nodes A, B, C are not necessarily always involved in each data transmission. By way of example, it is thus possible for node A to communicate with node C, and node B is not involved in this communication. Such data buses increasingly frequently connect the individual electronic system components of a vehicle to one another. However, it is also possible for data buses to be used in other areas, such as computer engineering or buildings engineering.

Figure 2:
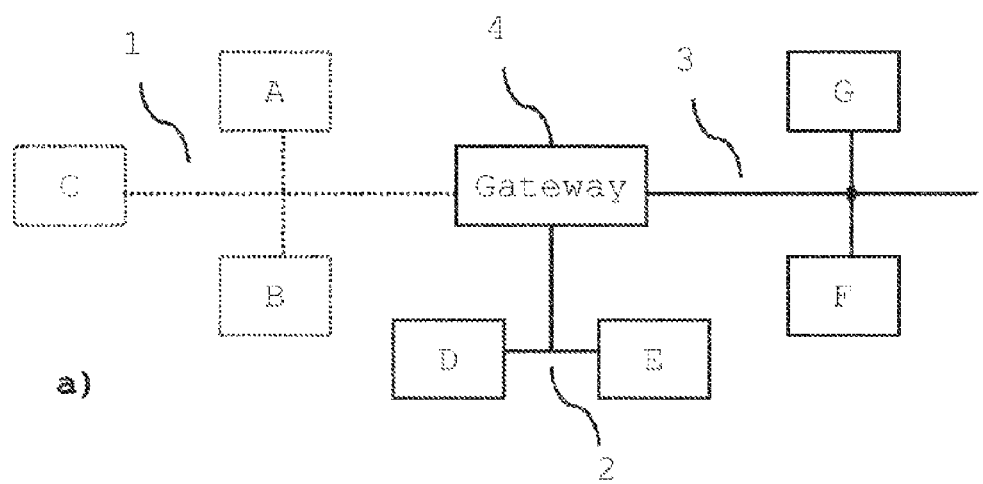
Figure 2:
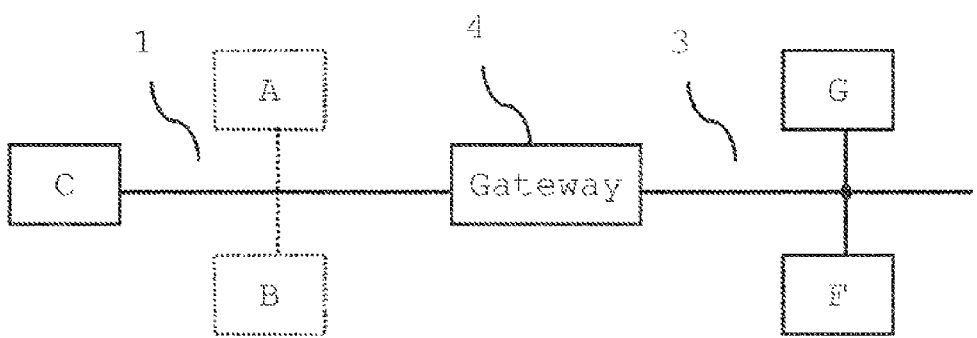

Besides the communication of a plurality of nodes, for example controllers in a vehicle, via a single bus, it is also possible for various such buses to communicate with one another. For this, a gateway 4 can be used, for example, which allows networks to communicate with one another even when they are based on totally different protocols. FIG. 2a schematically shows the design of a bus system having a gateway 4 and three different data buses 1, 2, 3. By way of example, nodes A, B, C are situated on a first data bus 1, nodes D, E are situated on a second data bus 2 and nodes F and G are situated on a third data bus 3.

When data communication between individual buses 1, 2, 3 or nodes A, B, C, D, E, F, G takes place in such a bus system, conventional solutions have all components situated on nodes A, B, C, D, E, F, G in the system active and consuming current during this period. Only at times at which no kind of communication is taking place in the bus system is it possible for components such as controllers to be put into a power-saving quiescent state. If just a single message is sent from a node A, B, C, D, E, F, G in the bus system while the components are in the quiescent state, all components change back to an active state again. For this reason, the power consumption of such a system is not inconsiderable.

The power consumption of individual components in the quiescent state is usually significantly lower than in the idle state (active state without communication). In order to reduce the total power consumption in such a communication network, what is known as partial networking was therefore developed.

The aim of partial networking is to keep only such components in an active state as are involved in communication in the network. Components that are not required for communication can be individually transferred to the quiescent state. FIG. 2a shows one option for such partial networking, what is known as bus partial networking. In this case, it is possible to transfer a complete bus to the quiescent state when it is not required for communication. In FIG. 2a, bus 1 with nodes A, B, C situated thereon are in the quiescent state, for example, while buses 2 and 3 with nodes D, E, F and G continue to be active. The gateway also continues to be active, and continues to allow the communication between the buses 1, 2, 3. Bus 1 would be transferred to an active state again only if the gateway 4 or one of the other two buses 2, 3 were to send the message that is intended for a node on the bus 1.

A further variant of the partial networking is what is known as node partial networking, which is shown schematically in FIG. 2b. FIG. 2b again shows the gateway 4, and also the buses 1 and 3 with nodes A, B, C, F, G. Both buses 1 and 2 are active, and only nodes A and B on the bus 1 are in the quiescent state. As soon as one of the nodes A or B is required for communication again, they are transferred back to the active state again. Since it is seldom that all the components of a bus system are required for communication simultaneously, in this way individual components are frequently in the quiescent state with a reduced power consumption in comparison with the idle state.

Figure 3:
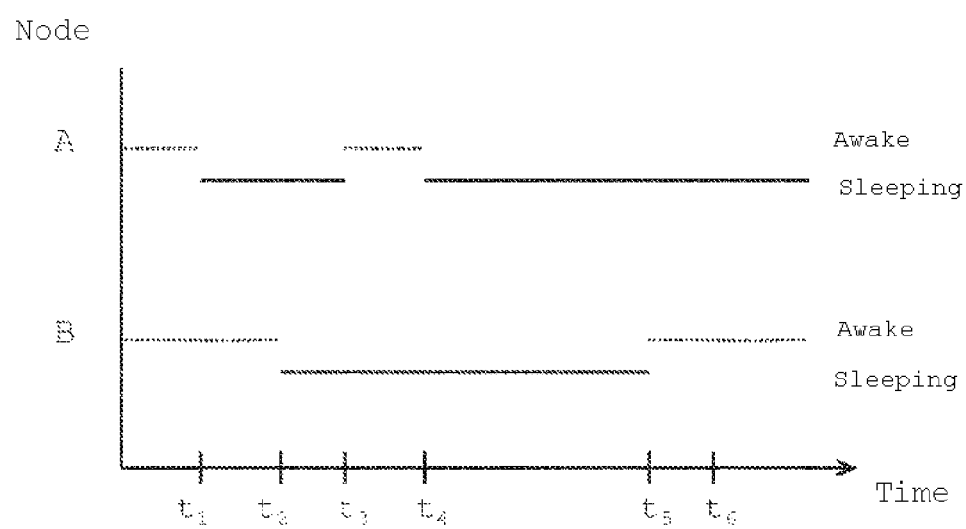

FIG. 3 shows an example of a possible temporal response from nodes A and B in the described system of node partial networking in terms of the states of said nodes. In this case, the active state is denoted by "awake" and the quiescent state is denoted by "sleeping". Initially, both nodes A and B are awake. Node A changes to the quiescent state at the time $t_1$, node B changes to the quiescent state at the time $t_2$. Whereas node B remains in the quiescent state until the time $t_5$, node A changes briefly to the active state from the time $t_3$ to the time $t_4$. During this period, the node A can send messages to other nodes or components in the system, or can receive messages from other nodes or components in the system. When node B changes to the active state again at the time $t_5$, node A is already in the quiescent state again. If node A has sent or received a message during a quiescent phase of node B, node B is not informed of this message when it is woken up. Node B has not been able to receive or send any messages that were sent on the bus while it itself was in the quiescent state. As a result, node B possibly sets out from a possibly outdated state when it is woken up. In most cases, however, it is important for each subscriber to know the current state at any time, unless it is in the quiescent state.

FIGS. 4a-e schematically show an inventive principle in order to solve the described problems of outdated states in nodes after they are woken up from the quiescent state. In this case, FIGS. 4a-e show a data bus 1 and also three nodes A, B, C. Node C differs from the other nodes in the network, specifically in that it stores (caches) messages from another node A that are sent on the bus. In this case, node C preferably stores all the messages from the relevant node A at any time.

Figure 4:
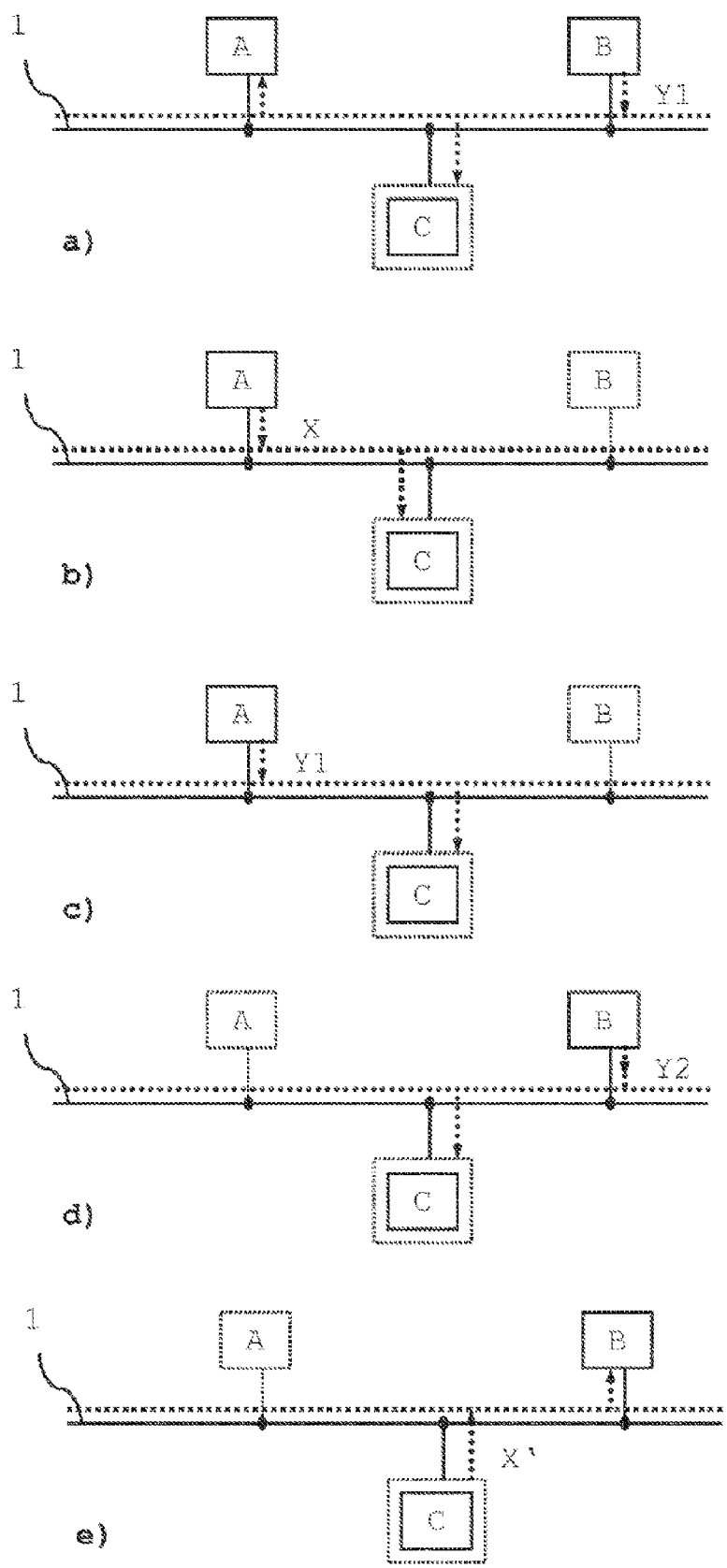

FIG. 4a shows the communication network at a time at which node B changes to the quiescent state. Node A is active at this time, as is node C. The other bus subscribers are informed of this change in the node B to the quiescent state by means of what is known as a sleep event Y1. FIG. 4b shows how node A sends the message X on the bus. Node B does not receive this message because it is in the quiescent state. The caching node C, which undertakes the caching for node A, receives the message X sent by A and initially stores it in its internal data memory. Other bus subscribers—not shown in the figure—that are also active at this time likewise receive the message X, but do not store it. The caching for a node A should preferably be undertaken by just one other node C in each case, it needing to be clear in the system which node undertakes this role.

FIG. 4c shows how node A now likewise changes to the quiescent state. The bus subscribers are again provided with knowledge of this change by a sleep event Y1. For a certain period, both nodes A and B are now in the quiescent state and therefore have no opportunity to communicate with one another directly. If node B next changes back to the active state again, for example, as shown in FIG. 4d, with the other bus subscribers being provided with knowledge of this by a wakeup event Y2, it must initially set out from an outdated state for node A. Node C, which has recognized the change in node B back to the active state, now decides whether messages from node A are in its memory.

An active node (C) typically has hardware support for the communication in order to be able to implement the communication as smoothly as possible. This hardware support typically comprises a transmission unit that sends the actual data and a hardware data memory that accepts data intended for sending, in order to subsequently send them when the communication channel is available. Thus, if there is a message in the internal data memory, node C initially transmits this message from the internal data memory to a hardware data memory and provides it there for sending. Next, node C sends this message on the bus, so that node B, inter alia, receives the message, as shown in FIG. 4e. In this case, messages X are sent from the hardware data memory of node C as soon as the bus is free. Hence, node B may possibly also receive the message X only after a certain delay time if the bus is initially still busy.

In FIG. 4e, instead of the original message from node A, a copy of this message X' is sent, which in this case is a suitable substitute for the original message X. The other bus subscribers, in this case particularly node B, therefore notice nothing of the absence of node A, since node C undertakes the tasks of the latter while node A is in the quiescent state. As a result of the sending of a message X or the copy X' thereof from node A by node C, node B is informed of alterations that have occurred during its own quiescent phase even in the absence of node A.

When node A returns to the active state, the other bus subscribers would in turn be informed thereof by means of a wakeup event Y2. This step is not shown explicitly again in the figures, since it has already been shown in FIG. 4d using the example of the change in node B, to the active state. From the time at which node C is provided with knowledge of the change in node A from the quiescent state back to the active state, it stops sending messages X or copies of messages X' from node A, and node A undertakes these tasks again itself. However, node C preferably only stops sending the messages from node A from this time, but continues to store new messages or copies of the messages from node A.

A copy X' may be either a complete copy of the original message X or a copy of the individual contents of the message X. Thus, by way of example, it is possible to store only relevant contents of the message X, with particular environment information being able to be customized by the caching node C as required. As a result of the customization of the information, the contents of the copy X' are not necessarily identical to those of the original message X, but rather may be partially or totally different from those of the message X. Customized contents could be a message counter updated by the caching node, a checksum or a caching status, for example. A checksum can be used to establish whether or not there is a transmission error. The caching status may likewise contain information about possible errors or faults.

In this case, the copy X' of a message X is assigned a different ID than the original message X. This allows the other nodes to see that it is a copy rather than the original message. A copy X' and its original X can never both be sent on a bus simultaneously. Instead of a copy X', however, there is also the option of storing the original message X and then sending it again, with the same ID. In this case, an absolutely identical message can be stored, or again individual contents of the message, such as a message counter, checksum or caching status, can be customized. In both cases, the other nodes do not notice that this message has been sent not by the original node but rather by the caching node.

Such an option for the caching node to send copies X' instead of original messages X can be chosen in such cases as when it is not desirable for the message X to be sent twice. This may be the case in CAN bus systems, for example. Preferably, a decision as to whether the original message X or the copy X' thereof will be sent by the caching node is made when the system is set up. In this way, a system always has just either one or the other option implemented, but not a mixture of both options.

The caching thus described ensures that each node is informed of sent messages, and does not have to set out from outdated values, when it is woken up from a quiescent state. Since a node that changes to the quiescent state cannot undertake the caching itself, it is necessary to ensure that one of the nodes in a system always remains in an active state and can undertake the caching in each case.

The active node C preferably stores messages from node A at any time, but undertakes the sending of these messages only when it has been provided with knowledge of a change in node A from the active state to the quiescent state. Active node C undertakes the sending of messages X that are sent in the system as soon as it has received an appropriate sleep event Y1 from node A. When node A returns to an active state again from the quiescent state, the active node C is again informed of its being woken up by means of a wakeup event Y2. From receipt of the information about a change back to the active state, or shortly after receipt of this information, node C does not send any further messages from a node A for which it undertakes the caching.

This principle can be applied not only in systems having just one bus but also in systems having a plurality of buses. In general, it is possible for a plurality of nodes in a system to be used for caching messages, each of the messages sent only ever being cached by one node. Hence, for each message sent, exactly one node undertakes the caching. In this case, a node may be either a controller or a gateway, for example.

Figure 5:
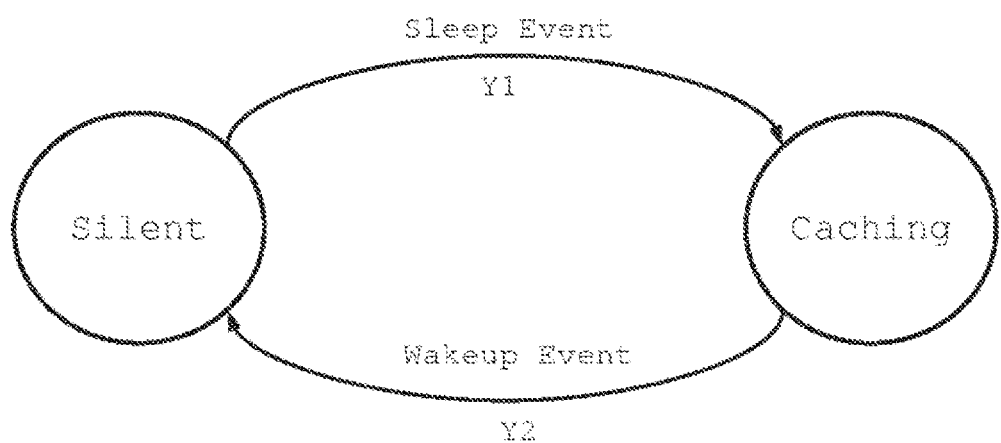

FIG. 5 shows the possible states of caching nodes. Thus, a caching node may be in either what is known as a silent mode or what is known as a caching mode. In the caching mode, the node undertakes both the storage (caching) and the sending of messages from one of the nodes; in the silent mode, although it stores (caches) messages from other nodes, it does not send these messages onward. In this case, a caching node manages a dedicated state SilentCaching for each original node that it caches. The trigger for changing from one to the other state is either a sleep event Y1 or a wakeup event Y2, with a sleep event Y1 setting out from a node that is changing to the quiescent state and a wakeup event Y2 setting out from a node when it changes back to the active state.

In this case, a sleep event Y1 or a wakeup event Y2 may be any usable piece of information, of any kind, that reveals the desire of a node to change to the quiescent state or to the active state. The information flow can be effected by transmitting one or more messages via the same, or else a different, bus, for example. A further option is for the information flow to be represented by a measurable change in the environment, for example. A measurable change of this kind may be a change in the power consumption behavior of a node when changing from an active to an inactive state (quiescent state) or vice versa, for example. The stipulation of a particular time would also be a further option. If a CAN bus is involved, a sleep or wakeup event may also be a network management message, for example. Such network management messages usually contain a plurality of bits that may store, inter alia, the network management address of a subscriber, a network status, a message counter or else a status, that is to say a reference to the state (active/inactive) of a subscriber. However, any other piece of information that can be transmitted in the bus system in arbitrary fashion is also conceivable as a sleep or wakeup event. This information does not necessarily have to be sent directly to the caching node.

The sending of a message X or the copy X' thereof may also be a wakeup event Y2, for example, which changes the caching node to the silent mode.

The disclosed method does not necessarily have to involve all messages being cached, however. Individual messages may be excluded from caching, for example if they are not relevant to the inactive node. For these messages, however, there is again the problem described at the outset that the inactive node, upon being woken up, is not informed of this or that this message is no longer available on the bus.

The transition of a node A from a quiescent state to an active state can be implemented in various ways. In the case of all the implementation options, the caching node C should initially have been provided with knowledge of the change in node A to the active state by a wakeup event Y2.

One option for further implementation is that node A, which is changing back to the active state, does not send other messages for a short time after the wakeup event Y2 has been sent. In this time, the caching node C can continue to send stored messages X, X' from node A. In this way, the transmission of a message X, X' that has already been started and has not yet concluded upon arrival of the wakeup event Y2 could still be completed, for example, without nodes A and C simultaneously sending messages on the bus. In FIG. 3, this period begins at $t_5$ and ends at $t_6$, for example. This time may be 10 ms, for example. However, node C needs to clearly establish the time $t_6$ from which it is not meant to send further messages. At this time $t_6$, all the messages that have already been provided for sending in the data memory need to be erased in order to prevent further sending.

A further option is not to permit such a time overlap. Node A, which is changing back to the active state, can in this case send further messages again itself immediately after the wakeup event Y2 has been sent. The caching node C then needs to ensure that the stored messages X, X' that have already been provided for sending in the data memory are erased from its data memory with minimum delay and no further messages from node A are sent. Transmission of messages X, X' by node C that has possibly already begun would in this case need to be interrupted immediately after the wakeup event arrives. In the case of this type of implementation, however, node A cannot send any other messages before the wakeup event Y2 is sent.

LIST OF REFERENCE SYMBOLS

1 Data bus
2 Data bus
3 Data bus
4 Gateway
A Communication node
B Communication node
C Communication node
D Communication node
E Communication node
F Communication node
G Communication node
Y1 Sleep event
Y2 Wakeup event
X Message
X' Copy of the message

What is claimed is:

1. A method for transmitting messages in a communication network having at least communication nodes, comprising:
    maintaining at least one of the communication nodes always in an active state;
    transforming at least one of the communication nodes from the active state to a quiescent state while it is not required for communication;
    informing, an active communication node, of a change in a particular communication node from the active state to the quiescent state by a sleep event and of a change in the particular communication node from the quiescent state back to the active state by a wakeup event;
    storing messages or copies of messages from the particular communication node in an internal data memory of the active communication node;
    the active communication node sends the stored messages or copies of messages in response to being informed of a change in the particular communication node from the active state to the quiescent state;
    the active communication node transmitting, from the internal data memory to an internal hardware data memory, messages or copies of messages to be sent, and the active communication node stops sending the stored messages or copies of messages and erasing from the hardware memory or copies of messages to be sent in response to being informed of a change in the particular communication node form the quiescent state back to the active state.

2. The method of claim 1, wherein the communication network is a vehicle bus.

3. The method of 1, wherein the active communication node is a controller or a gateway.

4. The method of claim 1, wherein at least one of the sleep event and the wakeup event is a network management message including information that indicates the status of the node whose messages are stored by the active node.

5. The method of claim 1, wherein at least one of the sleep event and the wakeup event comprises any piece of information suitable for identifying the state change in a node.

6. The method of claim 5, wherein the sleep event and/or the wakeup event is an information flow that is effected by measurable changes in the environment.

7. The method of claim 1, wherein individual messages are excluded from storage in the constantly active communication node.

8. The method of claim 1, wherein the copy is a copy of individual contents of the message.

9. The method of claim 1, wherein a copy of a message sent by the active node has a different ID than the original message.

10. The method of claim 1, wherein the sending of a stored message by a communication node is a wakeup event.

11. The method of claim 1, wherein a message and the copy thereof are never sent in a communication network simultaneously.

12. The method of claim 1, wherein a communication node does not send further messages for a particular period after it has sent a wakeup event.

13. The method of claim 12, wherein the active communication node stops sending messages stored after the particular period.

14. The method of claim 1, wherein a communication node is re-enabled to send messages after a wakeup event has been sent.

15. The method of claim 14, wherein the active communication node sends no further stored messages from the relevant communication node directly after a wakeup event has been received.

16. The method of claim 15, wherein the active communication node removes the messages from the hardware data memory immediately after the wakeup event has been received.

17. A network having at least three communication nodes that is used for transmitting messages,
    wherein at least one of the communication nodes is always kept in an active state,
    wherein at least one of the communication nodes is changed from the active state to a quiescent state while it is not required for communication,
    the active communication node is informed of a change in a particular communication node from the active state to the quiescent state by a sleep event and of a change in the particular communication node from the quiescent state back to the active state by a wakeup event,
    the active communication node has an internal data memory that stores messages or copies of messages from the particular communication node, and sends of these messages or copies of messages in response to being informed of a change in the pa particular communication node from the active state to the quiescent state,
    wherein the active communication node has a hardware data memory to which it transmits messages or copies of messages to be ready for sending and that are stored in the internal data memory of the active communication node, and
    wherein the active communication node stops sending the stored messages or copies of messages from the particular communication node and erases the messages or copies of messages ready for sending in the hardware data memory in response to being informed of a change in the particular communication node from the quiescent state back to the active state.

* * * * *